UNITED STATES PATENT OFFICE.

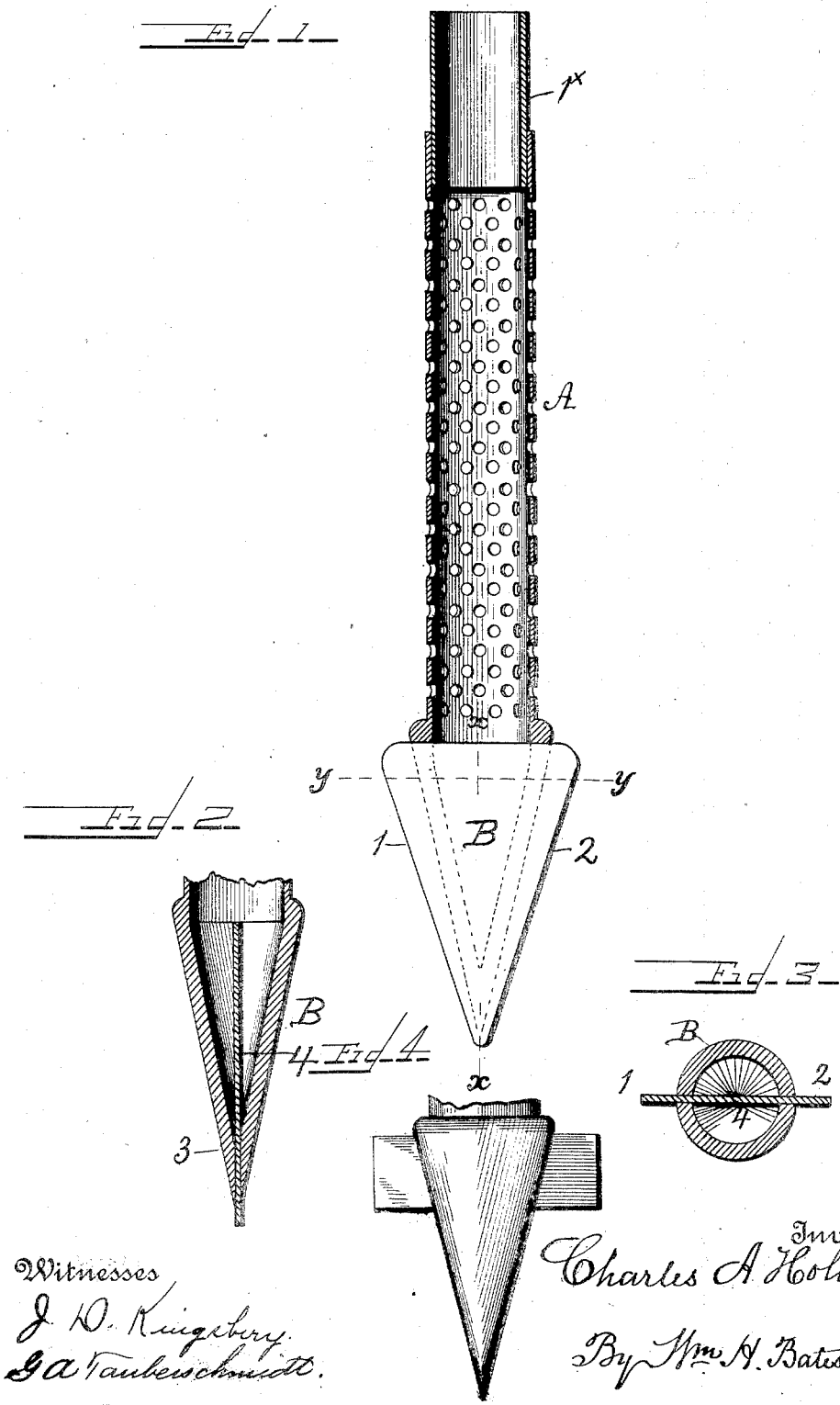

CHARLES A. HOLLAND, OF MAXTON, NORTH CAROLINA.

STRAINER-POINT FOR DRIVEN WELLS.

SPECIFICATION forming part of Letters Patent No. 468,343, dated February 9, 1892.

Application filed October 5, 1891. Serial No. 407,797. (No model.)

*To all whom it may concern:*

Be it known that I, CHARLES A. HOLLAND, a citizen of the United States, residing at Maxton, in the county of Robeson and State of North Carolina, have invented certain new and useful Improvements in Strainer-Points for Driven Wells; and I do hereby declare the following to be a full, clear, and exact description of the invention, such as will enable others skilled in the art to which it appertains to make and use the same.

My invention has relation to improvements in means for driving and setting the tubes for driven wells; and the object is to provide a new and useful point to the strainer of the pipe of a driven well, whereby an enlarged water-space may be formed immediately adjacent and surrounding the strainer of the well-tube.

My invention therefore consists in the novel construction of a terminal end of a strainer to a well-tube, as hereinafter fully described, and particularly as pointed out in the claim.

I have fully and clearly illustrated my invention in the accompanying drawings, wherein—

Figure 1 is a vertical central section of the strainer and front view of the flanged point. Fig. 2 is a vertical central section of the point on line $xx$ of Fig. 1. Fig. 3 is a transverse section on the line $yy$ of Fig. 1. Fig. 4 is a modified construction.

A designates the strainer, connected to the lower end of the pump tube or pipe $1^x$, as usual. The tube forming the strainer is perforated, as is commonly done, as shown in the drawings, and of course may be of any of the approved constructions. In driving the tube down it frequently occurs that an insufficient supply of water is reached, owing to the fact that the character of the soil immediately about the strainer is such that it will not become loosened or will not disintegrate to form a water-space about the strainer, and there is no remedy except to find other location or to submit to the insufficiency.

It is the purpose of my improvements to provide efficient, certain, and ready means whereby, irrespective of the character of soil through which the supply comes to the strainer, an enlarged space may be formed about the strainer, and this essentiality I accomplish and effect by making the point of the strainer at the junction therewith larger than the strainer itself and forming the point with side flanges, as hereinafter specified. With this object in view the point B is fixed on the end of the strainer and formed with tapering side flanges 1 2, substantially as shown in the drawings. The point B may be split vertically, as at 3, and a plate 4 be inserted in the split and secured by brazing or soldering, and the projecting edges form the flanges, which may be shaped down to the form described and shown. I thus provide means for removing the earth around the strainer and enlarging the water-space, so that the supply of water may be continuous.

After the well has been driven and the driver or auger withdrawn the well-tube is inserted with the strainer provided with my improved point connected thereto and the whole forced down to the position desired, and when the desired depth is reached the pipe is turned around until the flanges cut away the adjacent earth, and the action continues until the point of greatest depth is reached when the strainer will set in a made space or water-space. The turning of the tube cuts away the adjacent ground, and as the operation is proceeding the water carries the particles of loosened ground into the strainer, from whence they are pumped up and discharged, and in this way and by means of the cutting away of the earth around the strainer a space is made which permits a free flow of water into the strainer, irrespective of the character of the stratum surrounding it.

The insertion of the well-tube is not impeded by the presence of the flanges on the point of the strainer, because they cut their way straight down to the supply, which, being reached, the tube is then turned around and the flanges operate to cut away the ground about the seat of the strainer. The conical point of this tube is split longitudinally from its base to the apex thereof, and a V-shaped cutting-bar is rigidly secured in the split, the edges of the cutting-bar projecting from the split or slots, which form a point below the apex and continuous cutting-edges along the sides of the cone, as clearly shown in Figs. 2 and 3 of the drawings.

In Fig. 4 of the drawings I have shown the flanges angular and as extending only a portion of the length of the point.

Having thus described my invention, what I claim, and desire to secure by Letters Patent, is—

A driven-well tube having a conical point split longitudinally from its base to its apex and having a solid V-formed cutting bar or plate rigidly secured therein, the edes of said bar or plate, projecting from said slots, forming a point below said apex and forming continuous cutting-edges along the sides of the cone, as herein shown and described.

In testimony whereof I affix my signature in presence of two witnesses.

CHARLES A. HOLLAND.

Witnesses:
E. F. McRAE,
O. S. HAYES.